United States Patent [19]
Lee

[11] Patent Number: 5,301,065
[45] Date of Patent: Apr. 5, 1994

[54] COMPACT ZOOM LENS SYSTEM
[75] Inventor: Hung-Te Lee, Taipei, Taiwan
[73] Assignee: Industrial Technology Research Institute, Chutung, Taiwan
[21] Appl. No.: 940,678
[22] Filed: Sep. 4, 1992
[51] Int. Cl.$^5$ .............................................. G02B 15/14
[52] U.S. Cl. .................................................. 359/692
[58] Field of Search ............... 359/676, 684, 685, 686, 359/691, 692

[56] References Cited
U.S. PATENT DOCUMENTS

| 4,054,371 | 10/1977 | Yasukuni | 359/705 |
| 4,830,476 | 5/1989 | Aoki | 359/692 |
| 4,936,661 | 6/1990 | Betensky et al. | 359/692 |
| 5,153,777 | 10/1992 | Okada et al. | 359/692 |

FOREIGN PATENT DOCUMENTS 0042114 2/1992 Japan ................................ 359/676

*Primary Examiner*—Edward K. Look
*Assistant Examiner*—Christopher Verdier
*Attorney, Agent, or Firm*—W. Wayne Liauh

[57] ABSTRACT

A zoom lens system consists of four lens elements arranged in two groups. Counting from the object side, the first two elements form a front lens group with positive refracting power and the last two elements form a rear lens group with negative refracting power. An airspace is reserved between the front lens group and the rear lens group and it is made variable for zooming. The first lens element in the front lens group is a negative lens element and has its concave lens surface directed toward the object side. Both the two lens elements in the rear lens group are negative lens element. In the lens composition, both the front lens group and the rear lens group at least include an aspherical lens surface respectively for aberration correction.

17 Claims, 4 Drawing Sheets

COMPACT ZOOM LENS SYSTEM

BACKGROUND OF THE INVENTION

The present invention relates to a zoom lens system, and more particularly to a compact zoom lens system suitable for use in a 35 mm type twin lens camera.

It has been noted that the a zoom lens system is widely used in various types of cameras nowadays because it is capable of conveniently zooming the focal length of the lens system to facilitate the use of the camera. The zoom lens system having a variable zooming ratio, for example, from 1.3 to 2.0, falls into two categories. Typically, the first category consists of a front lens group having a negative refractive power and a rear lens group having a positive refractive power. An airspace is reserved between the front lens group and the rear lens group, and it is possible to effectuate variation of the focal length of the lens system by varying the airspace. Such a conventional zoom lens system is particularly suitable for use in the well-known single lens reflex cameras. However, such kind of zoom lens system has a serious disadvantage is that it has a long back focal length and a large diameter, and therefore making it impossible to make the zoom lens composition compact.

In view of the drawback of the first category of the prior art mentioned above, the second category of the zoom lens system is therefore designed to intend to shorten the back focal length and reduce the diameter of the lens system. Typically, the second category of the zoom lens system consists of a front lens group having positive refractive power and a rear lens group having negative refractive power, thus forming a so-called telephoto type zoom lens system. An airspace is also reserved between the front lens group and the rear lens group for zooming. This kind of zoom lens system is characterized in that it has a relatively shorter back focal length relative to the first category zoom lens system and therefore making it possible to be compact and sufficiently lightweight.

Various prior patents has been developed in this field. For example, U.S. Pat. No. 4,682,680 discloses a zoom lens system comprising five lens elements as a whole.

U.S. Pat. No. 4,838,669 discloses a zoom lens system having positive refractive power and a rear lens group having negative refractive power. The front lens group of the lens system consists of a positive meniscus lens, a negative lens, and at least one positive lens. The rear lens group of the lens system consists of a positive lens, a biconcave lens, and a negative meniscus lens.

U.S. Pat. No. 4,682,860 discloses a zoom lens system comprising a front lens groups having a positive refractive power and a rear lens group having a negative refractive power. The first lens group includes at least two positive lens elements and at least one negative lens element; the second lens group includes at least one positive lens element and at least one negative lens element. It is noted that the fourth embodiment as shown in FIGS. 9A and 9B of this U.S. patent comprises five lens elements forming a zooming lens system. However, it has lens elements with relatively steep radii of curvature and thus is relatively costly to manufacture.

U.S. Pat. No. 4,991,945 disclosed a zoom lens comprising five lens elements. The first three elements form a positive lens group and the last two elements form a negative lens group.

SUMMARY OF THE INVENTION

The primary object of the present invention is to provide a compact zoom lens system for use in twin lens camera, and especially for use in 35 mm type miniatured camera. The present invention has the advantages of short total length and small outside diameter.

The other object of the present invention is to provide a compact zoom lens system comprising only four lens elements, in which the first three elements form a positive front lens group and the last two elements form a negative rear lens group. An airspace reserved between the front lens group and the rear lens group is made variable to effect zooming. Further, in the preferred embodiment of the present invention, both the front lens group and the rear lens group comprise at least an aspherical lens surface respectively to effectively make the aberration correction.

The other objects and features of the invention will become more apparent from the following description taken in connection with the accompanying drawings.

DETAILED DESCRIPTION OF THE INVENTION

Figure 1:
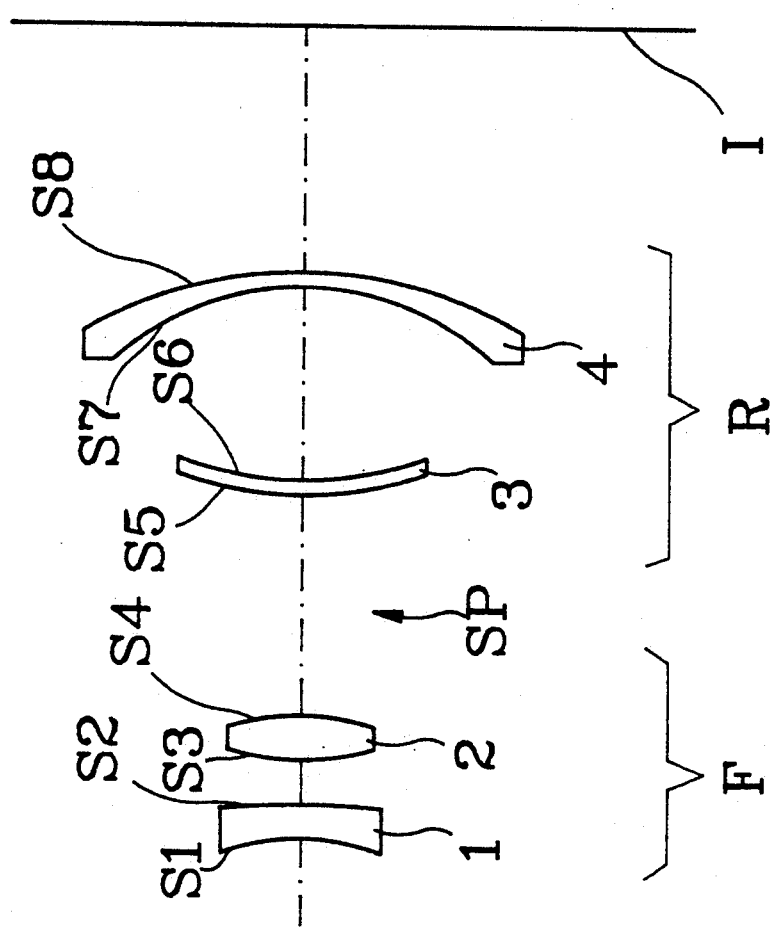
FIG. 1 shows a schematic view of a zoom lens composition in accordance with the present invention.

Referring now to FIG. 1, it is shown a schematic view illustrating a zoom lens composition of the present invention, which is composed of four lens elements 1, 2, 3, and 4 forming an optical lens system. In the order from the object side to the image plane I, the first two lens elements 1 and 2 form a front lens group F and the last two lens elements 3 and 4 form a rear lens group R. The front lens group F has a feature of positive refractive power while the rear lens group has a feature of negative refractive power. An airspace SP is reserved between the front lens group F and the rear lens group R, and it is made variable to effect zooming.

In FIG. 1, the reference numerals S1 and S2 represent the lens surfaces of the first lens element 1; the reference numerals S3 and S4 represent the lens surfaces of the second lens element 2; the reference numerals S5 and S6 represent the lens surfaces of the third lens element 3; and the reference numerals S7 and S8 represent the lens surface of the fourth lens element 4. In addition, reference numeral I represents an image plane.

During zooming operation from wide-angle position to telephoto position, the front lens group F and the rear lens group R are moved toward the object side away from the image plane I as a whole, and the axial air separation (i.e. airspace SP) between the front lens group and the rear lens group is decreased proportionaly to the increase of the focal length.

Counting from the object side to the image plane along with the optical axis of the lens composition as shown in FIG. 1, the front lens group F consists of a negative lens element 1 and a positive lens element 2. In such an arrangement, it is noted that the negative lens element 1 in the front lens group F has its concave surface directed toward the object side and the radii of curvature of which is less than 0. The rear lens group B consists of two negative lens element 3 and 4, in which the first negative lens element 3 has its convex surface directed toward the object side. That is, counting from the object side to the image side, the compact lens system of the present invention has a lens composition in a negative first lens element 1, a positive second lens element 2, a variable air space SP, a negative third lens element 3, and a negative fourth lens element 4 in sequence.

In the lens composition as shown in FIG. 1, both the front lens group F and the rear lens group R include at least an aspherical surface respectively for aberration correction. Furthermore, because the zoom lens system of the present invention comprises only four lens elements, it can be easily manufactured and is inexpensive to build.

Figure 2A:
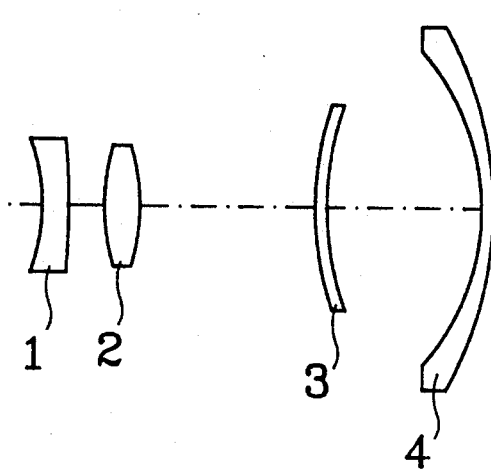
FIG. 2A is a longitudinal sectional view of a first embodiment of a zoom lens according to the present invention in wide angle position.
Figure 2B:
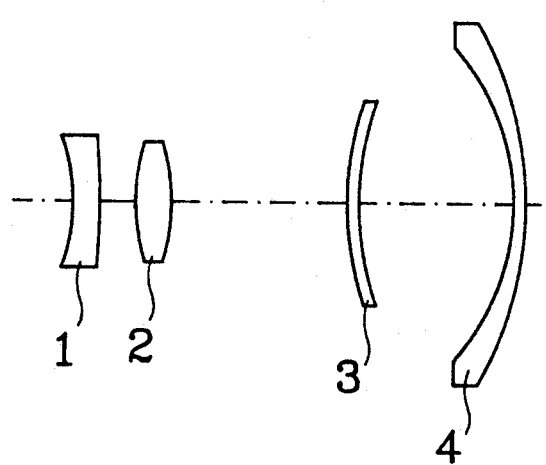
FIG. 2B is a longitudinal sectional view of a first embodiment of a zoom lens according to the present invention in middle position.
Figure 2C:
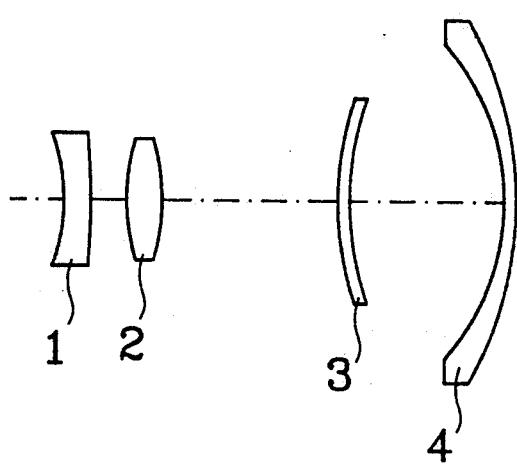
FIG. 2C is a longitudinal sectional view of a first embodiment of a zoom lens according to the present invention in telephoto position.
Figure 3A:
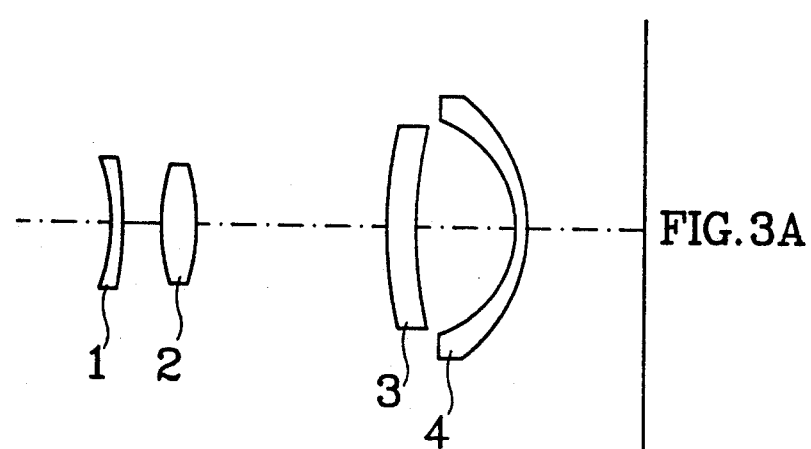
FIG. 3A is a longitudinal sectional view of a second embodiment of a zoom lens according to the present invention in wide angle position.
Figure 3B:
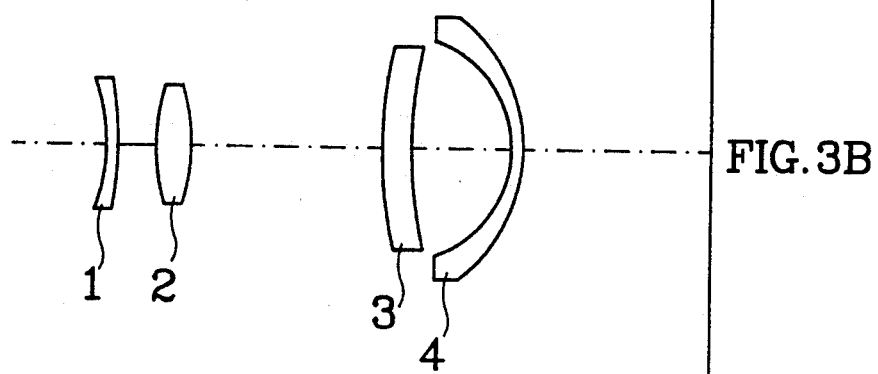
FIG. 3B is a longitudinal sectional view of a second embodiment of a zoom lens according to the present invention in middle position.
Figure 3C:
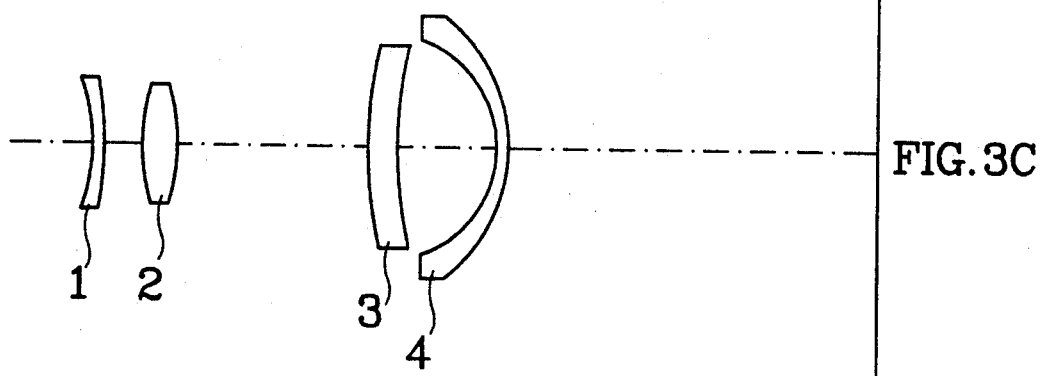
FIG. 3C is a longitudinal sectional view of a second embodiment of a zoom lens according to the present invention in telephoto position.
Figure 4A:
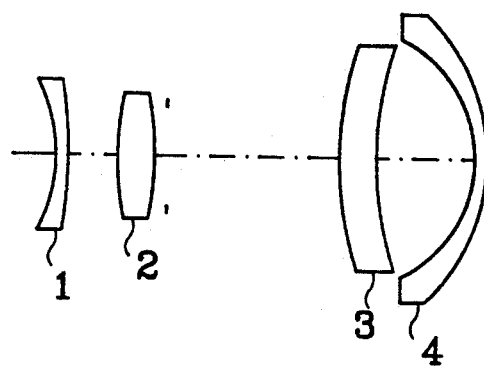
FIG. 4A is a longitudinal sectional view of a third embodiment of a zoom lens according to the present invention in wide angle position.
Figure 4B:
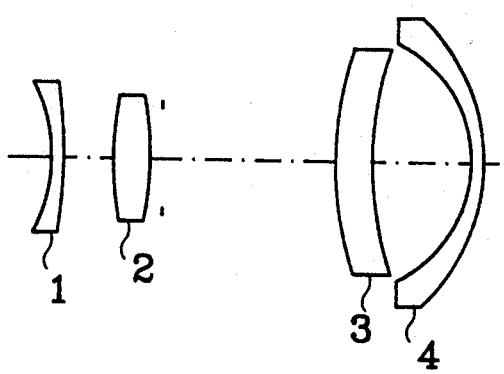
FIG. 4B is a longitudinal sectional view of a third embodiment of a zoom lens according to the present invention in middle position.
Figure 4C:
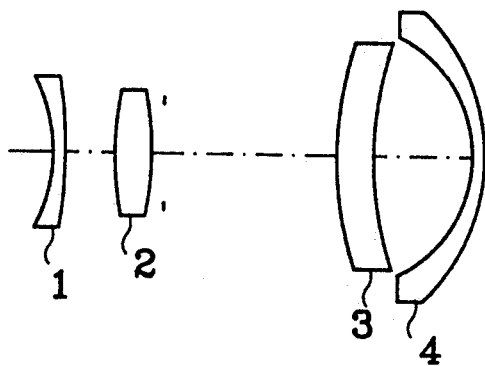
FIG. 4C is a longitudinal sectional view of a third embodiment of a zoom lens according to the present invention in telephoto position.

Based on the lens composition of the present invention as shown in FIG. 1, the first embodiment of the present invention is shown in FIGS. 2A, 2B, and 2C in various operational modes, in which FIG. 2A is a longitudinal sectional view of the first embodiment of the zoom lens system according to the present invention in wide angle position; FIG. 2B is a longitudinal sectional view of the first embodiment of the zoom lens system according to the present invention in middle position; and FIG. 2C is a longitudinal sectional view of the first embodiment of the zoom lens system according to the present invention in telephoto position. The second embodiment of the zoom lens system of the present invention is shown in FIGS. 3A, 3B, and 3C in various operational modes, in which FIG. 3A is a longitudinal sectional view of the second embodiment of the zoom lens according to the present invention in wide angle position; FIG. 3B is a longitudinal sectional view of the second embodiment of the zoom lens according to the present invention in middle position; and FIG. 3C is a longitudinal sectional view of the second embodiment of the zoom lens according to the present invention in telephoto position.

The following numerical data are given for the first and second embodiments of the present invention as described above.

| FIRST EMBODIMENT | | | | |
|---|---|---|---|---|
| focal length 39.5–45.0–58.0 | | | F. No. 6.0–6.9–8.9 | |
| S | R | W | N | Ab |
| S1 | −13.01 | 1.839 | 1.746 | 29.4 |
| S2 | −42.771 | 3.126 | | |
| S3 | * | 3.000 | 1.492 | 57.2 |
| S4 | * | 15.296-12.198-7.212 | | |
| S5 | 28.356 | 1.000 | 1.492 | 57.2 |
| S6 | * | 11.737 | | |
| S7 | −13.00 | 1 | 1.746 | 39.5 |
| S8 | −23.22 | | | | wherein

* represents that the specific lens surfaces are aspherical

S represents the surfaces of the respective lens elements as shown in FIG. 1

R represents the radii of curvature of respective lens surfaces

W represents thicknesses of respective lenses and air separation between respective lenses along with the optical axis of the lens composition N represent refractive indices of respective lenses Ab represent the Abbe's number of respective lenses The feature of the aspherical lens surface may be indicated by the following equation:

$$Z = \frac{VY^2}{1 + [1 - (1+k)V^2Y^2]^{\frac{1}{2}}} + AY^4 + BY^6 + CY^8 + DY^{10}$$

wherein

Z represents the sag of the lens

K represents the radii of curvature of the lens (V=1/R)

K represents the Konic Constant

Y represents the height of the lens from the optical axis of the lens system

A represents the 4 factorial aspherical constant

B represents the 6 factorial aspherical constant

C represents the 8 factorial aspherical constant

D represents the 10 factorial aspherical constant

In accordance with the equation above, the data for the aspherical lens surfaces of the first embodiment of the present invention is given below:

| S | R | K | A | B | C | D |
|---|---|---|---|---|---|---|
| S3 | 19.420 | 0 | $-0.61425*10^{-6}$ | $0.28339*10^{-6}$ | $0.98830*10^{-7}$ | $-0.15160*10^{-8}$ |
| S4 | −13.587 | 0 | $-0.13637*10^{-3}$ | $-0.22446*10^{-5}$ | $0.28667*10^{-6}$ | $-0.62966*10^{-8}$ |
| S6 | 22.784 | 0 | $-0.32646e^{-4}$ | $0.53646*10^{-6}$ | $-0.87499*10^{-6}$ | $-0.62906*10^{-9}$ |

| SECOND EMBODIMENT | | | | |
|---|---|---|---|---|
| focal length 39.48–44.98–57.97 | | | F. No 6.0–6.9–8.9 | |
| S | R | W | N | Ab |
| S1 | −12.806 | 1.00 | 1.7666 | 28.2 |
| S2 | −33.276 | 3.50 | | |
| S3 | * | 3.00 | 1.492 | 57.2 |
| S4 | * | 15.089-12.503-8.340 | | |
| S5 | 41.429 | 2.45 | 1.492 | 57.2 |
| S6 | * | 8.29 | | |
| S7 | −9.639 | 1.00 | 1.834 | 37.2 |
| S8 | −14.839 | | | |

The data for the aspherical lens surfaces of the second embodiment of the present invention are given below:

| S | R | K | A | B | C | D |
|---|---|---|---|---|---|---|
| S3 | 19.634 | 0 | $-0.24344 \cdot 10^{-4}$ | $-0.67671 \cdot 10^{-6}$ | $0.9188 \cdot 10^{-8}$ | $-0.21076 \cdot 10^{-8}$ |
| S4 | $-13.396$ | 0 | $0.11121 \cdot 10^{-3}$ | $-0.25409 \cdot 10^{-5}$ | $0.22953 \cdot 10^{-6}$ | $-0.55520 \cdot 10^{-8}$ |
| S6 | 28.584 | 0 | $-0.69582 \cdot 10^{-4}$ | $0.70969 \cdot 10^{-6}$ | $-0.20378 \cdot 10^{-7}$ | $0.12684 \cdot 10^{-9}$ |

The meaning of the symbols of the second embodiment shown above is the same as that of the same symbols of the first embodiment. Also, the equation of the aspherical lens surface of second embodiment is the same as that of the first embodiment.

THIRD EMBODIMENT
focal length 39.48–44.98–57.97    F. No 6.0–6.9–8.9

| S | R | W | N | Ab |
|---|---|---|---|---|
| S1 | $-12.874$ | 1.00 | 1.75520 | 27.5 |
| S2 | $-29.724$ | 3.43 | | |
| S3 | 20.752 | 3.00 | 1.492 | 57.2 |
| S4 | * | 15.455–12.650–8.134 | | |
| S5 | 39.552 | 3.00 | 1.492 | 57.2 |
| S6 | * | 7.966 | | |
| S7 | $-10.000$ | 1.000 | 1.83400 | 37.2 |
| S8 | $-14.700$ | | | |

The data for the aspherical lens surfaces of the third embodiment of the present invention are given below:

| S | R | K | A | B | C | D |
|---|---|---|---|---|---|---|
| S4 | $-13.987$ | 0 | $0.116861 \cdot 10^{-3}$ | $-0.20453 \cdot 10^{-5}$ | $0.145437 \cdot 10^{-6}$ | $-0.362076 \cdot 10^{-8}$ |
| S6 | 25.102 | 0 | $-0.529167 \cdot 10^{-4}$ | $0.545541 \cdot 10^{-6}$ | $-0.129874 \cdot 10^{-7}$ | $0.771507 \cdot 10^{-3}$ |

The meaning of the symbols of third embodiment shown above is the same as that of the same symbols of the first embodiment. Also, the equation of the aspherical lens surface of the third embodiment is the same as that of the first embodiment.

So far, the feature of the present invention has been described in detail. It will be obvious to those skilled in the art to use this invention according to the above detailed description. While the arrangement herein described constitutes a preferred embodiment of this invention, it is to be understood that various changes and modifications may be made therein without departing from the scope and spirit of the invention as defined in the appended claim.

What I claimed is:

1. A compact zoom lens system having an object and an image side through which light travels from the object side to the image side, comprising:
   (a) a front lens group and a rear lens group, said front lens group being closer to an object side and having a positive power, and said rear lens group being closer to an image side and having a negative power;
   (b) an air space between said front lens group and said rear lens group, said air space being made variable to facilitate zooming from wide angle to telephotos;
   (c) said front lens group comprising at least first and second lenses wherein said first lens is closer to the object side and said second lens is closer to the image side;
   (d) said first lens having a negative power and first and second optical surfaces wherein said first optical surface is closer to the object side and said second optical surface is closer to the image side;
   (e) said second lens having a positive power and third and fourth optical surfaces wherein said third optical surface is closer to the object side and said fourth optical surface is closer to the image side;
   (f) said rear lens group comprising at least third and fourth lenses wherein said third lens is closer to the object side and said fourth lens is closer to the image side;
   (g) said third lens having fifth and sixth optical surfaces wherein said fifth optical surface is closer to the object side and said sixth optical surface is closer to the image side;
   (h) said fourth lens having seventh and eighth surfaces wherein said seventh optical surface is closer to the object side and said eighth optical surface is closer to the image side; and
   (i) both said third and fourth lenses having negative power;
   (i) wherein said compact zoom lens system satisfies the following condition:

$$-0.38 < R_1/f_w < -0.2, \text{ and}$$

$$0.4 < f_2/f_w < 1.0$$

wherein: $R_1$ is the radius of said first optical surface,
$f_w$ is the focal length of said compact lens at wide angle, and
$f_2$ is the focal length of said second lens group.

2. A compact zoom lens system having an object and an image side through which light travels from the object side to the image side, comprising:
   (a) a front lens group and a rear lens group, said front lens group being closer to an object side and having a positive power, and said rear lens group being closer to an image side and having a negative power;
   (b) an air space between said front lens group and said rear lens group, said air space being made variable to facilitate zooming from wide angle to telephotos;
   (c) said front lens group comprising at least first and second lenses wherein said first lens is closer to the object side and said second lens is closer to the image side;
   (d) said first lens having a negative power and first and second optical surfaces wherein said first optical surface is closer to the object side and said second optical surface is closer to the image side;
   (e) said second lens having a positive power and third and fourth optical surfaces wherein said third optical surface is closer to the object side and said fourth optical surface is closer to the image side;

(f) said rear lens group comprising at least third and fourth lenses wherein said third lens is closer to the object side and said fourth lens is closer to the image side;

(g) said third lens having fifth and sixth optical surfaces wherein said fifth optical surface is closer to the object side and said sixth optical surface is closer to the image side;

(h) said fourth lens having seventh and eighth surfaces wherein said seventh optical surface is closer to the object side and said eighth optical surface is closer to the image side;

(i) both said third and fourth lenses having negative power; and (j) wherein both said third and fourth lenses have a meniscus shape, and both said fifth and eighth optical surfaces are convex surfaces and both said sixth and seventh surfaces are concave surfaces.

3. A compact zoom lens system having an object side and an image side through which light travels from object side to image side, comprising:

(a) a front lens group and a rear lens group, said front lens group being closer to the object side and having a positive power, and said rear lens group being closer to the image side and having a negative power;

(b) an air space between said front lens group and said rear lens group, said air space being made variable to facilitate zooming from wide angle to telephoto;

(c) said front lens group comprising at least first and second lenses wherein said first lens being closer to the object side than said second lens and having a negative power; and (d) said rear lens group comprising at least two negative lenses; wherein (e) both of said lenses of said rear lens group are meniscus-shaped and their centers are bent away from each other.

4. The compact zoom lens system of claim 3 wherein said first lens has a meniscus shape and the center of which is bent toward the image side.

5. A compact zoom lens system having an object side and an image side through which light travels from the object side to the image side, comprising:

(a) a front lens group and a rear lens group, said front lens group being closer to the object side and having a positive power, and said rear lens group being closer to the image side and having a negative power;

(b) an air space between said front lens group and said rear lens group, said air space being made variable to facilitate zooming from wide angle to telephotos;

(c) said front lens group comprising at least first and second lenses wherein said first lens is closer to the object side and said second lens is closer to the image side;

(d) said first lens having a negative power and first and second optical surfaces wherein said first optical surface is closer to the object side and said second optical surface is closer to the image side;

(e) said second lens having a positive power and third and fourth optical surfaces wherein said third optical surface is closer to the object side and said fourth optical surface is closer to the image side, and said third lens has a meniscus shape;

(f) said rear lens group comprising at least third and fourth lenses wherein said third lens is closer to the object side and said fourth lens is closer to the image side;

(g) said third lens having fifth and sixth optical surfaces wherein said fifth optical surface is closer to the object side and said sixth optical surface is closer to the image side and wherein said fifth optical surface is a convex surface, and said sixth optical surface is a concave surface;

(h) said fourth lens having seventh and eighth surfaces wherein said seventh optical surface is closer to the object side and said eighth optical surface is closer to the image side; and (i) both said third and fourth lenses having negative power.

6. The compact zoom lens system of claim 5 wherein said first lens has a meniscus shape.

7. The compact zoom lens system of claim 6 wherein said first optical surface is a concave surface, and said second optical surface is a convex surface.

8. The compact zoom lens system of claim 5 wherein said front lens group consists essentially of said first lens and said second lens.

9. The compact zoom lens system of claim 5 wherein at least one of said first, second, third, or fourth surface is aspherical.

10. The compact zoom lens system of claim 9 wherein said fourth optical surface is aspherical.

11. The compact zoom lens system of claim 10 wherein both of said third and fourth optical surfaces are aspherical.

12. The compact zoom lens system of claim 5 wherein said third and fourth lenses of said rear lens surfaces are aspherical.

13. The compact zoom lens system of claim 5 wherein said rear lens group consists essentially of said third and fourth lenses.

14. The compact zoom lens system of claim 5 wherein at least one of said fifth, sixth, seventh, or eighth surface is aspherical.

15. The compact zoom lens system of claim 14 wherein said sixth surface is aspherical.

16. The compact zoom lens system of claim 5 wherein said fourth lens has a meniscus shape.

17. The compact zoom lens system of claim 16 wherein said seventh optical surface is a concave surface, and said eighth optical surface is a convex surface.

* * * * *